United States Patent Office 3,069,269
Patented Dec. 18, 1962

3,069,269
ANIMAL FEED PRODUCT
Martin Rubin, Silver Spring, Md., assignor, by mesne assignments, to Advance Growth Capital Corporation, Chicago, Ill., a corporation of Illinois
No Drawing. Filed June 22, 1959, Ser. No. 821,657
1 Claim. (Cl. 99—2)

This invention relates to a low cost nutritious feed for animals such as sheep and cattle prepared from a readily available but toxic plant source.

The plant *Agave lecheguilla* grows profusely in the semiarid regions of certain parts of Texas and New Mexico. It grows as a cluster of hard spiny leaves originating from a central core. Despite the poor physical nature of the plant as a foodstuff, other grazing crops in these regions are so sparse that animals are frequently driven to eat the *Agave lecheguilla* plant. Unfortunately the outcome of this indulgence is often fatal for the grazing animals. Following the ingestion of this plant material, sheep and cattle develop the signs and symptoms of the disease called "bighead." In the sheep the disease is characterized by edema of the head region with development of a greatly swollen and enlarged head and neck region. In affected animals the liver becomes involved with degeneration, the kidneys are affected with ultimate loss of ability of the animal to form urine. In addition to the above symptoms, the non-pigmented white areas of the skin of the animals become highly sensitive to sunlight, with the resultant effects of skin irritation and eruption. This disease has been a well recognized entity in grazing areas infested with *Agave lecheguilla*.

Since *Agave lechequilla* is the dominant plant life over many thousands of square miles in the arid parts of Texas and New Mexico, the economic loss of poisoned animals and unutilizable waste land represents considerable hardship to the inhabitants of those regions.

The object of the instant invention is to provide a process for converting *Agave lecheguilla* into an edible non-toxic animal feed.

A further object is to provide a conversion procedure which is capable of converting *Agave lecheguilla* plants into an animal feed and industrial by-products.

It has been found that by suitable extraction procedures the toxic ingredients can be removed from the *Agave lecheguilla*. The residual plant material remaining after extraction of the toxins has all the nutritive values of the plant. By the usual procedures of grinding, pelleting, etc. this residue is converted to a palatable feed of the consistency and appearance of other animal feeds. Interestingly enough the proximate analysis given below in a description of a specific example of this process and product, shows the material to be superior in nutritive value to that of cured dried hay.

The instant invention provides not only for the preparation of the nitritious feed from a poisonous plant which has been generally described above, but also for the recovery of the extracted materials as industrial products. This latter recovery provides a further economic basis for the utilization of this poisonous range plant which will all the more encourage its collection and gradual extermination from the area on an organized industrial scale.

Concentration of the extracts obtained from *Agave lecheguilla* by the procedure of this invention provides a residue with unusual detergency properties. The product is in the category of the so-called non-ionic detergents which have the ability to exhibit excellent detergent values whether the medium be a highly concentrated salt solution, an acid solution, or a basic solution. The extract product has utility as a detergent under a wide variety of operating conditions.

Since chemical studies indicate that the extract product is largely a saponin, the instant invention contemplates recovery thereof for conversion into hormones, corticoids or any of the other steroid pharmaceuticals so important to the medical arts.

To insure that the extracted plant matter have removed therefrom all of the toxins, it is important that a proper extraction medium and procedure be followed. By and large the effective solvents are the water soluble $C_1$–$C_4$ fatty alcohols, namely, methanol, ethanol, isopropanol, n-propyl alcohol, secondary and tertiary butyl alcohols.

These solvents are particularly effective for completely removing the phyto pigments and saponins which largely, if not entirely, constitute the toxic ingredients present in *Agave lecheguilla* plants. According to the practice of the instant invention a single countercurrent extraction, or two to three batch extractions with a solvent to meal ratio exceeding 5 to 1 by weight will remove enough of the poisonous materials to make the extracted residue edible by animals. Concomitantly, maximum recovery of by-products from the extract, which is also desirable, can be effected readily by evaporation off of these low boiling solvents at moderate temperatures.

Regarding the practice of the instant invention, it is important to note that the *Agave lecheguilla* plant is a known source of fiber. Such fiber is used commercially for manufacture of the brush bristles commonly used in household brushes and brooms. Unfortunately, collection and recovery of the fiber manually, as has been the custom, involves discarding the residual mass in a non-utilizable form. However, in recent years mechanical devices have been developed for the purpose of extracting the fiber values from the plant material. The residual difibered or decorticated pulp so obtained is of unusual utility for purposes of this invention. Actually, mechanical removal of fiber by available devices provides a pulp in which the ratio of residual fiber to other components is at an especially appropriate ratio for use of the extracted residue as an animal feed. On the other hand the entire plant may be utilized particularly under plant operating conditions for which extraction of detergent products and other values may be the primary economic objective and animal feed the secondary economic objective.

To carry out the instant invention, the fresh whole plant or plant segment desired is chopped, cut or broken into small pieces and immediately immersed in solvent. This procedure serves to inhibit completely the usual sequence of enzymatic changes which otherwise serve to complicate the extractive removal of saponins and otherwise diminsh the feed value of the extracted residual product.

After alcoholic extraction the extract is concentrated by distillation to leave a largely aqueous mixture of saponins, pigments and other alcoholic extractives which constitutes a good detergent concentrate. To recover the saponin by-product as a detergent solid or for other purposes, the concentrate is diluted with 2–5 volumes of a solvent chosen from the class of lower water soluble ketones and ethers selected from the group consisting of acetone, tetrahydrofuran, dioxane, dioxolane, methyl ethyl ketone. The chosen solvent serves to dissolve pigments and other materials while causing the saponin to precipitate out as a crystalline white to pale yellow solid which may be readily filtered and dried to provide the essentially pure detergent. Even as a saponin the product is sufficiently pure for chemical conversion into steroid products, if desired.

The following examples further illustrate the practice of this invention.

Example I

Three hundred pounds of meal obtained by mechanical decortication of the *Agave lecheguilla* plant were extracted by stirring at 40–50° C. with 300 gallons of 95% ethanol. The mixture was stirred for 1½ hours and then the solvent removed by decantation and filtration. The extraction procedure was repeated twice more with equal quantities of 80% ethyl alcohol. Following the last extraction, decantation and filtration, the residual meal was dried in a rotary drier at 75° C. with provision for recovery of the extracting solvent. The resulting dry meal so obtained constitutes a well blended particulate mixture of excellent suitability for grinding to feed consistency in a Wiley mill. Analysis of material prepared in this manner provided the following proximate analytical results:

| | Percent |
|---|---|
| Dry matter | 93.1 |
| Protein | 7.33 |
| Ash | 19.8 |
| Fat | 0.54 |
| Crude fiber | 22.0 |
| Readily digestible carbohydrate | 50.4 |
| Total digestible nutrients | 55.0 |

It is evident from these results that the product has the feed equivalent of cured dried hay.

The alcoholic extracts were combined and concentrated by distillation to a volume of 10 gallons to obtain the detergency values of the *Agave lecheguilla* plant. The essentially alcohol free concentrate so obtained could be utilized, as such, as a detergent under any conditions in which the colored pigments present in the mixture are of no significant detriment. As obtained by the above described procedure, the concentrated extract is a viscous oil with a deep brown green fluorescence in sunlight illumination.

The pigments of the *Agave lecheguilla* plant may be removed from the oily concentrate and the detergent values obtained in dry form by dilution of the residue with 2–5 volumes of acetone. Thus in the present example the 10 gallons of crude detergent residue is cooled to room temperature or below and treated with 30 gallons of acetone. Mixing induces the precipitation of the saponin detergent values and the solution in the solvent of the pigments originating from the source plant. The detergency values are obtained as a cream colored amorphous solid which may be air dried to a friable mass. The product has excellent detergency and sudsing characteristics. The procedure described here yields 40 lbs. of dry saponin material.

Example II

Three hundred pounds of whole plant of *Agave lecheguilla* were cut into pieces smaller than half inch square by passing the plants through a Ball and Jewel rotary cutter. The chopped plant material was then extracted as described in Example I, above, with 95% ethanol followed by two extractions with 80% ethanol (balance water). The dried meal obtained by the same procedure as described in Example I showed the following analytical values:

| | Percent |
|---|---|
| Dry matter | 92.5 |
| Protein | 6.6 |
| Ash | 17.6 |
| Fat | 0.45 |
| Crude fiber | 32 |
| Readily digestible carbohydrate | 51 |
| Total digestible nutrients | 53 |

Workup of the alcoholic extract for the detergent values provided a crude product comparable to that described in Example I, above. Purification by acetone precipitation provided 33 lbs. of solid material of a quality comparable to that described in Example I.

Example III

The extraction procedure of Example II was effected substituting methanol and isopropanol for ethanol as solvent. The products, both meal and saponin, were substantially the same as reported in Example II both in quantity and quality.

As has been previously indicated, the preferred precipitating solvents consist of the group: tetrahydrofuran, dioxane, dioxolane, methyl ethyl ketone and acetone. They are all equally good for purposes of saponin by-product. Thus to illustrate the use of these other solvent agents:

Example IV

The alcoholic extract of Example I was concentrated in vacuo at about 50° C. to 10 gallons of viscous oil. Then 30 gallons of tetrahydrofuran was added, and the entire mixture cooled to 15° C., then allowed to stand for 24 hours at this temperature. The precipitate which formed (saponin) was removed by filtration, washed on the filter with fresh solvent, and dried.

Precipitation has been similarly effected with the other named oxygenated solvents.

What is claimed is:

A process which comprises extracting fresh plant tissue of *Agave lecheguilla* plants with an alcohol selected from the group consisting of methanol, ethanol, n-and iso-propanol sec- and tert-butanol, recovering the extracted residue and feeding same to animals.

References Cited in the file of this patent

UNITED STATES PATENTS

| 1,394,162 | Gebhardt | Oct. 18, 1921 |
| 2,715,122 | Rothman | Aug. 9, 1955 |
| 2,791,581 | Wall | May 7, 1957 |
| 2,897,192 | Nord | July 28, 1959 |